United States Patent [19]

Poole

[11] 4,037,142
[45] July 19, 1977

[54] ELECTROLYTIC CAPACITOR PACKAGE HAVING A GROMMET WITH TAPERED LEAD HOLES

[75] Inventor: Ralph B. Poole, Hillsville, Va.

[73] Assignee: Sprague Electric Company, North Adams, Mass.

[21] Appl. No.: 653,563

[22] Filed: Jan. 29, 1976

[51] Int. Cl.$^2$ .............................................. H01G 9/00
[52] U.S. Cl. .................................. 361/433; 174/52 S
[58] Field of Search ................. 317/230, 242; 29/570; 174/152 G, 50.56, 50.57, 50.52, 52 S

[56] References Cited

U.S. PATENT DOCUMENTS

| 1,032,878 | 7/1912 | Camate | 174/152 G |
|---|---|---|---|
| 2,151,806 | 3/1939 | Schnoll et al. | 29/570 |
| 2,169,967 | 8/1939 | Smith | 174/152 G |
| 2,211,780 | 8/1940 | Jacobs | 174/152 G |
| 2,803,693 | 8/1957 | Kurland et al. | 174/50.56 |
| 2,825,855 | 3/1958 | Frekko | 174/50.56 |
| 2,970,182 | 1/1961 | Miquelis | 317/230 |
| 3,124,727 | 3/1964 | Murray | 317/230 |
| 3,321,676 | 5/1967 | Ross | 317/230 |
| 3,454,840 | 7/1969 | Hagihara et al. | 317/230 |
| 3,686,538 | 8/1972 | Webster | 317/230 |

Primary Examiner—Michael J. Lynch
Assistant Examiner—James W. Davie
Attorney, Agent, or Firm—Connolly and Hutz

[57] ABSTRACT

A sealed electrolytic capacitor package includes an electrolytic capacitor section enclosed in a metal housing having an elastomeric grommet sealed in an open end of the housing. At least one lead extends through a tapered hole in the grommet, the large opening end of the tapered hole being positioned at the inside face of the grommet. The grommet has a raised mesa portion of irregular shape at one of its faces to aid in sensing the proper grommet orientation for insertion of one or more leads during assembly.

7 Claims, 6 Drawing Figures

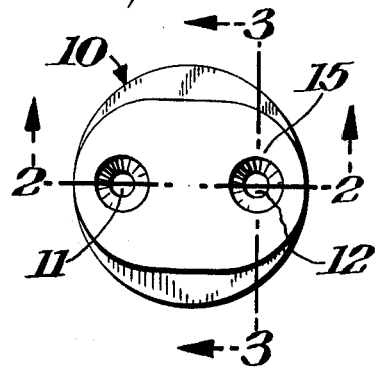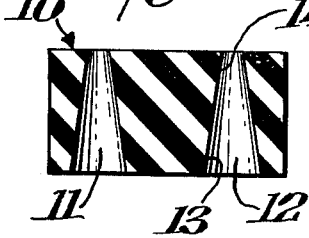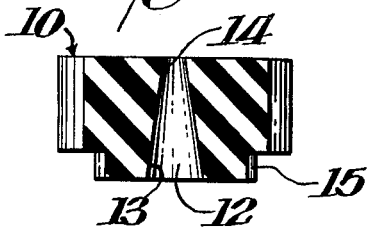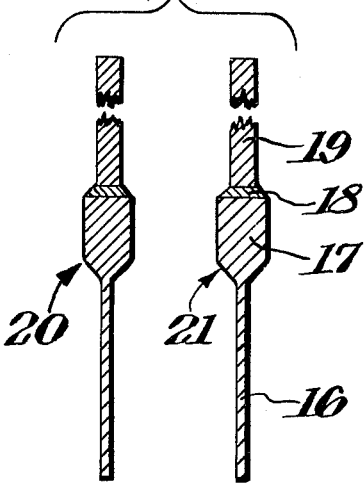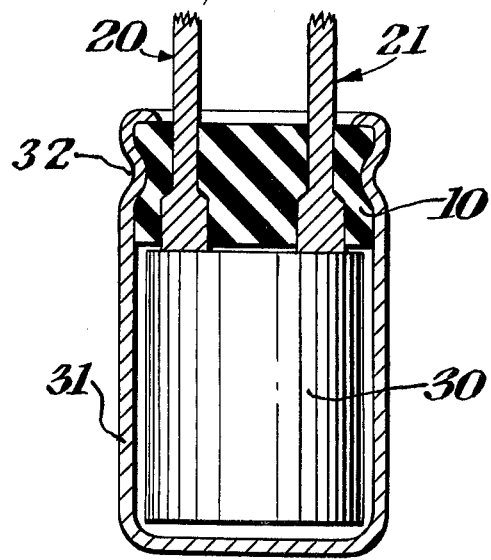

ELECTROLYTIC CAPACITOR PACKAGE HAVING A GROMMET WITH TAPERED LEAD HOLES

BACKGROUND OF THE INVENTION

This invention relates to a sealed electrolytic capacitor package and more particularly to an elastomeric grommet and through-lead assembly for effecting the package seal, and more particularly to such a package having tapered lead holes in the grommet.

An elastomeric grommet-through-lead assembly that is presently used extensively for the sealed packages of low cost electrolytic capacitors comprises a rubber stopper or bung adapted at an outer periphery to be sealed in an open end of a metal housing. The bung usually has two cylindrical holes each having an unstressed diameter slightly less than the diameter of the riser portion of a lead that is subsequently pressed into a grommet hole to effect a compression seal there between. The riser portion extends completely through the grommet and a smaller diameter lead wire usually of copper or copper clad steel is welded to each riser portion to provide a solderable lead for connecting the packaged capacitor into an electrical circuit system. Thus the grommet is in uniform compressed contact with this riser lead portion for the entire length of the grommet hole.

It is also known to employ a stepped hole in the grommet whereby a cylindrical portion of the hole near the outer face of the grommet is compressed about the wire portion of the lead and a larger cylindrical portion of the hole near the inner face of the grommet is compressed about the larger riser portion of the lead.

However, these commonly employed lead seal constructions have the serious disadvantage that the lead is too easily pulled out of the grommet. Consequently when an electrolytic capacitor package of conventional construction is mounted by the leads to a printed circuit board, for example, and the capacitor package is mechanically pushed or shocked laterally as by inadvertently striking either the board or the capacitor package housing, one or both leads is typically pulled out of the originally mounted position in the grommet. This typically causes a weakening or complete disruption of the lead to grommet seal and in some cases damages the lead to capacitor section connection, in either case causing serious damage to the capacitor.

It is a primary object of this invention to overcome the above noted disadvantages.

It is a further object of this invention to provide a low cost electrolytic capacitor package with sealed leads that are characterized by having a high lead-pull strength.

It is a further object of this invention to provide a highly effective seal between a lead and an elastomeric grommet.

SUMMARY OF THE INVENTION

A sealed electrolytic capacitor package includes an electrolytic capacitor section enclosed in a metal housing. The housing has an elastomeric grommet sealed in an open end thereof. At least two metal leads are internally connected to the capacitor section. Each lead passes through a round tapered hole in the grommet and extends fron the outer face of the grommet to provide electrical access to the capacitor from outside the package.

Each tapered hole has the largest diameter at the inside grommet face. The lead therein has a middle riser portion of diameter substantially equal to the largest hole diameter. The lead further has a wire of smaller diameter joined (e.g. buttwelded) to and essentially concentric with the middle lead portion. A connection is made between the capacitor section and the middle lead portion. The lead extends through the tapered grommet hole with the lead butt weld positioned in the hole. Thus the grommet is distorted and compressed about the lead most strongly at a region of the middle lead portion near the weld and again at the region of the wire lead portion as it exits the grommet from the outside face thereof creating in effect a double seal of the lead in the grommet.

Furthermore, the lead is so wedged into the tapered grommet hole that it can advantageously withstand pulling forces of greater magnitude than leads in the aforementioned conventional package structures prior to rupturing the seal or damaging the capacitor.

Another feature of this invention, although not essential, is a raised mesa portion of the grommet at one face thereof. The mesa has an irregular shape to indicate at which grommet face the tapered grommet hole or holes is largest. The mesa also aids in orienting the grommet, having two or more holes, with leads radiating from a capacitor package having a corresponding spacing, prior to a simultaneous leads insertion step during assembly.

BRIEF DESCRIPTION OF THE DRAWING

FIG. 1 shows in a bottom view an elastomeric grommet of this invention having two tapered holes therein.

FIG. 2 shows in a side sectional view the grommet taken in plane 2—2 as defined in FIG. 1

FIG. 3 shows in another side sectional view the grommet taken in plane 3—3 as defined in FIG. 1.

FIG. 4 shows in isometric view a metal lead employed in the package of this invention.

FIG. 5 shows in a sectional view a pair of spaced metal leads properly oriented relative to the grommet in FIG. 2 for insertion therein.

FIG. 6 shows in sectional view a capacitor package of this invention employing the grommet of FIG. 1 and the leads of FIG. 5.

DESCRIPTION OF THE PREFERRED EMBODIMENT

The grommet 10 is shown in a bottom view, or as will become clear later an inside of the package view is shown. This grommet is employed in the preferred embodiment of this invention and has two round tapered holes 11 and 12, each extending through and between two opposed faces of the grommet. These features of the holes are shown in the sectional views of FIGS. 2 and 3. The grommet is preferably made of butyl rubber because it is chemically inert to a wide range of electrolytes. However, many other rubbers may be employed such as ethylene-propylene rubber when a mild electrolyte such as ammonium borate ethylene glycol is used.

In FIG. 4 there is shown a metal lead having a thin flat tab 16, a middle riser portion 17, a wire end portion 19 and a butt weld junction 18 that joins the riser and wire portions in a concentric relationship. The tab and riser portions may be formed from one piece of metal and for use in an aluminum foil electrolyte-capacitor package is preferably made of essentially pure aluminum. The wire portion 19 is preferably a tinned copper wire or a copper clad steel having a smaller diameter than the cylindrical riser portion 17.

The two identical leads 20 and 21 seen in FIG. 5 are aligned for insertion into the grommet holes 11 and 12 in FIG. 2, according to a preferred method of assembly of the novel package of this invention that is described below.

The assembled package of the preferred embodiment of this invention is shown in FIG. 6. A standard wound aluminum foil electrolytic capacitor section 30 has a cylindrical shape and has the tab 16 of lead 21 (FIG. 5) stitched to one of the foils (for example the anode foil) and the other tab 16 of lead 20 stitched to the other foil (for example the cathode foil). These tab to foil connections are made by well known methods of stitching or welding prior to winding the foil and interspersed insulating spacers into the wound roll or section 30. The position of the tabs 16 along the foils is predetermined so that after winding the section, the leads have the appropriate spacing for simultaneous insertion into the grommet holes.

After the initial insertion of both leads into the grommet holes, the leads are further pushed and/or pulled through the grommet until the junction 18 of each lead reaches well inside the grommet. By so doing, the elastomeric grommet has points of greatest distortion and is most tightly sealed to the leads at two positions along each lead, namely at the lead weld junction 18 and at the point along the wire portion 19 at which it exits the grommet at the upper or outside face. These conditions are caused to exist by a pre-established dimensional relationship by which the diameter 14 of the hole at the outside grommet face in the natural unstressed condition is smaller than the diameter of the lead wire portion 19 ad the diameter of the lead riser portion 17 is essentially equal to the tapered hole diameter 13 at the inside grommet face.

The capacitor section is next impregnated with a suitable electrolyte and inserted into a cylindrical metal housing 31 having an open upper end. The grommet is inserted within the mouth of the open end of the housing and spin-crimped around the grommet. This crimping provides a tight seal between the housing and the rommet while further compressing the grommet inwardly about the leads. A portion of the encircling crimp is an inwardly compressing bead 32 as shown in FIG. 6. This bead is preferably in a plane that lies above and further from the capacitor section 30 than the riser and lead wire weld junctions so as to further compress the bung 10 about the small lead wires and further enhance the lead pull strength.

Another feature of the grommet of the preferred embodiment is a mesa or raised grommet portion 15 at the inside face of grommet 10. The mesa may alternatively be at the outisde face of the grommet. The mesa 15 has an irregular non-circular shape as viewed in FIG. 1 in the plane of the inside face. The mesa 15 advantageously permits ready determination especially by automatic means for detecting which face of a grommet contains the large diameter end of the tapered holes. Furthermore, the irregularly shaped mesa provides a means, especially automatic means, for orienting a grommet having two or more holes relative to the spaced leads radiating from the capacitor section. Since there are two identical holes in the rommet 10, the mesa 15 is provided an irregular shape having two axes of symmetry as seen in FIG. 1 which is generally adequate to provide an indication of either one or the other of the two possible alignments to two identical leads. More than two axes of symmetry would not be suitable. A mesa having only one axis of symmetry would be required in a grommet having more than two holes, or for a grommet having two holes of dissimilar dimensions.

It is thus seen that the package of this invention provides a strong lead to grommet structure while providing a capability for automated assembly. The novel electrolytic capacitor package of this invention thus provides stronger leads than conventional low cost electrolytic capacitor packages while retaining the capability for low cost automatic assembly steps.

What is claimed is:

1. A sealed electrolytic capacitor package comprising:

an electrolytic capacitor section;

a metal housing containing said capacitor section and having an open end;

an elastomeric grommet being mounted in and sealed to said open end of said housing, said grommet having in the unstressed condition at least two round tapered holes therein extending from the inner face to the outer face of said grommet, the largest diameter of each said tapered hole being at said inner face;

at least two metal leads, each one of said leads being sealed in one of said at least two holes, respectively, said each one lead having a round middle portion of diameter commensurate with said largest diameter of said one hole, said each one lead having a round wire end portion of fixed diameter smaller than said diameter of said middle lead portion and larger than the unstressed diameter of said one tapered hole at said outer grommet face, the junction of said middle and said wire end lead portions being contained within said one hole, said wire end portion extending outwardly from said grommet and said middle lead portion being connected to said capacitor section to provide electrical access thereto from the outside of said sealed electrolytic capacitor package.

2. The package of claim 1 wherein said elastomeric grommet has at one of said grommet faces a raised mesa portion of an irregular shape as viewed in the plane of said one face.

3. The package of claim 2 wherein said irregular shape of said mesa has no more than two axes of symmetry.

4. The package of claim 1 wherein said capacitor section is of a wound aluminum foil electrolytic type, said each one lead having a flat tab portion extending from said middle portion and said tab being attached to one of said aluminum foils to provide said connection between said each one lead and said capacitor section.

5. The package of claim 4 wherein said middle lead portion is aluminum, said wire lead portion contains copper and said junction therebetween is a weld junction.

6. The package of claim 1 wherein said elastomeric grommet is made of rubber.

7. The package of claim 6 wherein said rubber is butyl rubber.

* * * * *